Jan. 23, 1962 C. P. CARLSON 3,017,710
SNOW MOVER AND UTILITY CART
Filed May 28, 1958 2 Sheets-Sheet 1
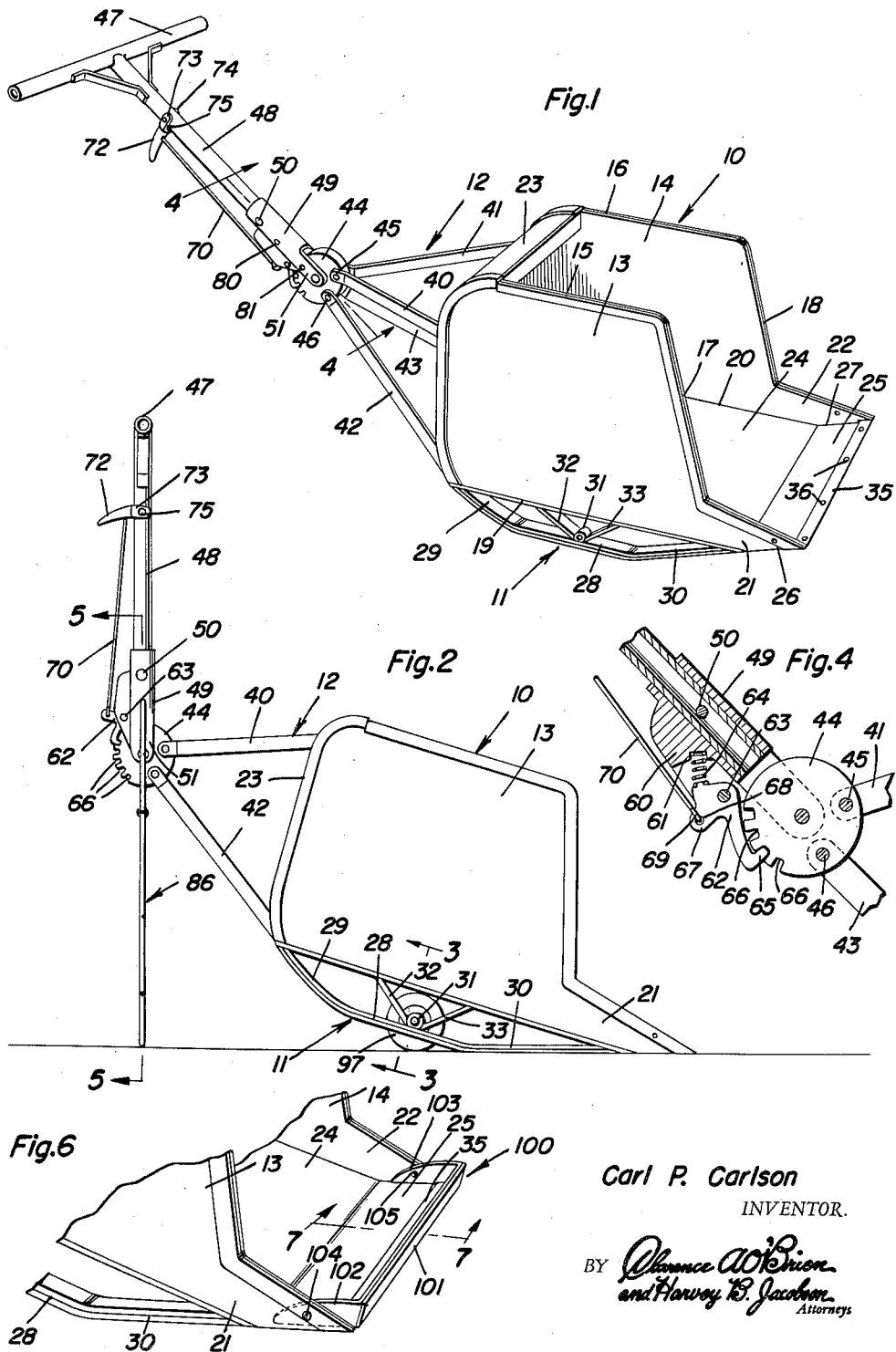
Carl P. Carlson
INVENTOR.
BY *Clarence A. O'Brien*
*and Harvey B. Jacobson*
Attorneys Jan. 23, 1962 C. P. CARLSON 3,017,710
SNOW MOVER AND UTILITY CART
Filed May 28, 1958 2 Sheets-Sheet 2
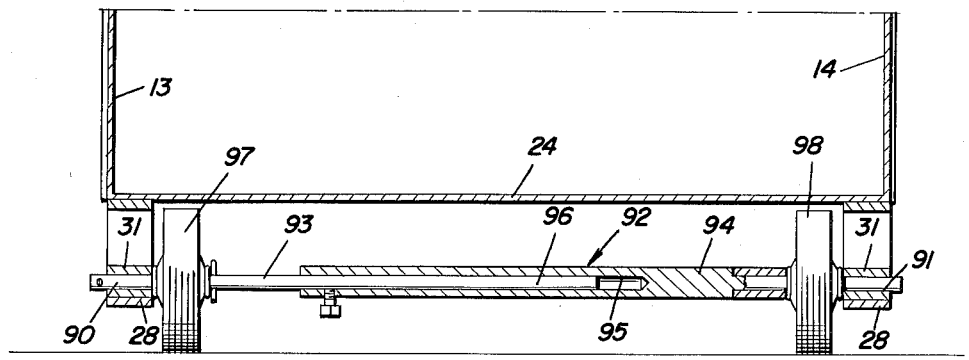
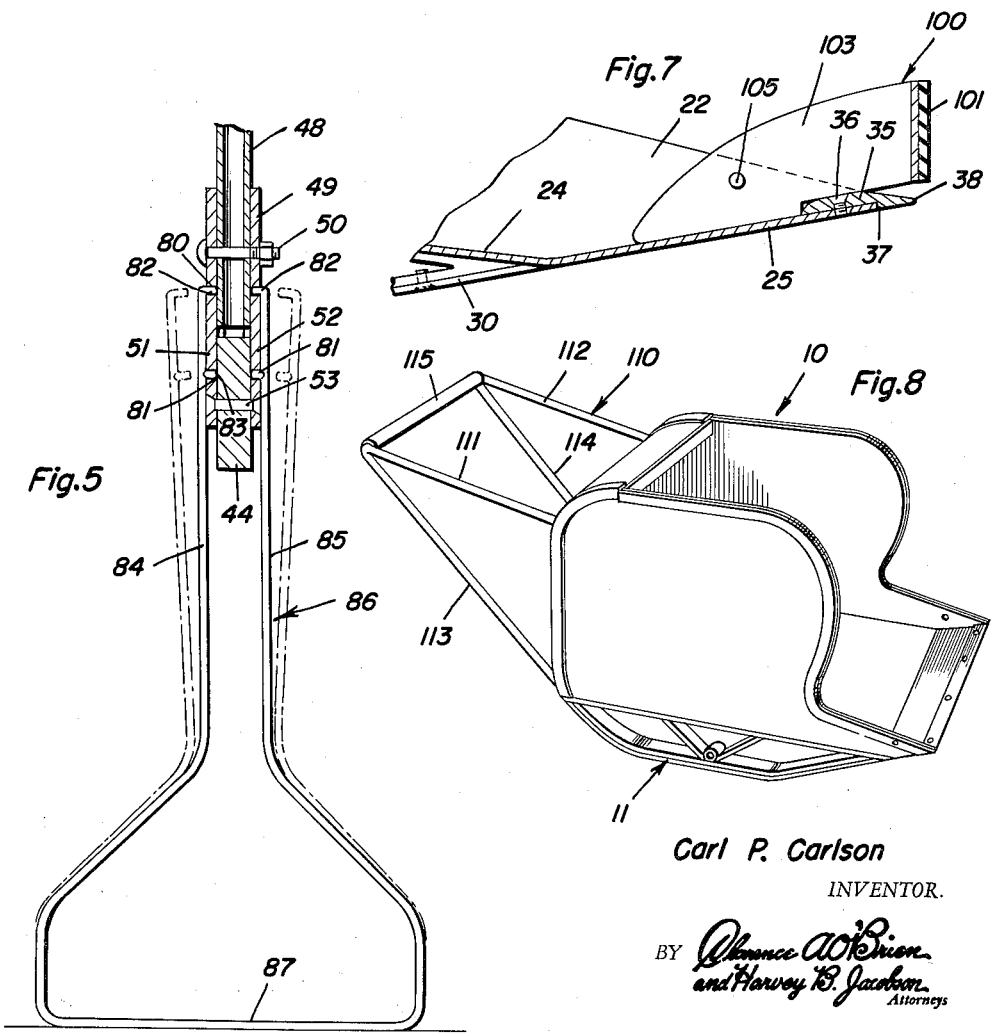
Carl P. Carlson
INVENTOR.

United States Patent Office 3,017,710
Patented Jan. 23, 1962

3,017,710
SNOW MOVER AND UTILITY CART
Carl P. Carlson, Duthie, Idaho
(P.O. Box 394, Murray, Idaho)
Filed May 28, 1958, Ser. No. 738,505
3 Claims. (Cl. 37—123)

This invention relates generally to utility vehicles and pertains more particularly to a hand manipulated cart and more particularly to such a device provided with scooping means for engaging and picking up a load and transporting it to a dumping point.

Of primary concern in connection with this invention is to provide a cart having a body of generally open construction in one portion thereof and provided with a scooping blade and having handle means associated therewith whereby the cart may be manipulated to scoop up a load and to subsequently be manipulated to transport the load to a desired point for dumping.

Another object of this invention is to provide a cart assembly particularly adapted for use as a snow removal mechanism and having a receptacle-like body provided with an open front portion having a scooping blade thereon and with the ground engaging support mechanism for the body being such as to permit the body to be rocked or tilted between a scooping position and a transporting position.

A further object of this invention is to provide a cart of the type particularly adapted for scooping up loads and incorporating a receptacle-like body provided with an open front and a scooping blade thereon upwardly angulated with respect to the flat bottom of the receptacle, the body having a supporting framework underlying the same including opposite side rail members extending fore and aft along opposite sides of the body and including forward ground engaging portions which are substantially coplanar with respect to the upwardly angulated scooping blade whereby the body may be rocked to a position supported by the forward portions of the side rails with the blade in a scooping position.

A further object of this invention is to provide a cart in conformity with the foregoing object in which the side rails are provided with intermediate portions substantially parallel to the flat bottom of the receptacle-like body which may be utilized as skids or runners for moving the body while transporting a load disposed therein.

Still another object of this invention is to provide a snow removal cart or the like having a body provided with an open forward end and a scoop blade thereat wherein the body has a flat bottom and the scoop blade is upwardly angulated with respect thereto, there being an underlying supporting framework for the body including central side rail portions substantially parallel to the flat bottom of the body and upwardly angulated forward portions substantially coplanar with the scoop blade, the rear portion of the body being provided with a handle assembly for manipulating the cart and with the handle assembly being so constructed and arranged as to permit pivotal adjustment of the handle assembly with respect to the body, the supporting framework being additionally provided with bearings on the central portions of the side rails for selectively carrying a wheel and axle assembly with the diameters of the wheels being such as to permit full engagement of the forward portions of the side rails upon the ground so as to dispose the scoop blade in an operative position.

These together with other objects and advantages which will become subsequently apparent reside in the details of construction and operation as more fully hereinafter described and claimed, reference being had to the accompanying drawings forming a part hereof, wherein like numerals refer to like parts throughout, and in which:

FIGURE 1 is a perspective view of a snow mover or utility cart constructed in accordance with this invention;

FIGURE 2 is a side elevational view of the assembly shown in FIGURE 1 but illustrating the handle means in an upright position and further illustrating the stand mechanism associated therewith to support the cart;

FIGURE 3 is an enlarged vertical section taken substantially along the plane of section line 3—3 in FIGURE 2 illustrating details of the axle and wheel assembly and illustrating the mounting means therefor;

FIGURE 4 is an enlarged sectional view taken substantially along the plane of section line 4—4 in FIGURE 1 and illustrating details of the pivotal latch assembly for the handle mechanism;

FIGURE 5 is an enlarged vertical section taken substantially along the plane of section line 5—5 in FIGURE 2 illustrating the details of the construction of the stand assembly and illustrating in full and dotted lines therein the operative association of the stand assembly with the handle mechanism;

FIGURE 6 is an enlarged perspective view of the scoop end portion of the receptacle and illustrating the guard assembly associated with the scoop blade;

FIGURE 7 is an enlarged vertical section taken substantially along the plane of section line 7—7 in FIGURE 6 illustrating further details of the scoop blade and the guard assembly associated therewith; and FIGURE 8 is a perspective view of a modified form of cart assembly.

Referring at this time more particularly to FIGURE 1, the invention will be seen to consist essentially of a receptacle-like body indicated generally by the reference character 10 provided with an underlying supporting framework indicated generally by the reference character 11 and provided at the rear end of the body with a handle assembly indicated generally by the reference character 12. The body itself consists of a pair of spaced vertical side walls 13 and 14 having substantially horizontal upper edge portions 15 and 16 with downwardly sloping forward edge portions 17 and 18 terminating above the flat horizontal lower edges 19 and 20 to leave the forwardly extending projections 21 and 22. The body also includes a rear wall portion 23 and a substantially flat and horizontal bottom wall 24, substantially as is shown, leaving the body of receptacle-like form having an open top and forward end and with there being provided, as an extension of the bottom wall 24, an upwardly angulated scooping blade portion 25 extending between the correspondingly upwardly angulated lower edge portions 26 and 27 of the forward extensions 21 and 22.

The supporting framework 11 consists of a pair of identically formed opposite side rail members extending fore and aft along the opposite sides of the body 10 and each including a substantially horizontal central portion 28 generally parallel to the bottom wall 24, an upwardly and rearwardly angulated rear portion 29 and an upwardly angulated forward portion 30 the latter of which is substantially coplanar with the blade portion 24 of the body for a purpose which will be presently apparent.

On the upper surface of each of the intermediate portions 28 is located a fixed bearing member 31 and which may be provided with upwardly divergent brace or strut portions 32 and 33 extending between the bearing and the undersurface of the body substantially as is shown. The particular configuration of the supporting framework assemblage as is described permits of a rocking motion for the body 10 when the supporting framework itself is used as the ground engaging support for the body. That is to say, if the side rails are utilized in the manner of runners, the central portions 28 thereof may be engaged against the ground with the bottom 24 of the body in a substantially horizontal position and the cart or snow mover manipulated while in this position for transporting purposes. Alternatively, for transporting purposes, the body may be rocked still further rearwardly by virtue of the disposition and angulation of the rear portions 29 of the side rails.

When it is desired to engage and scoop up a load, the forward portions 30 of the side rails are engaged in flat relationship to the ground and the handle assembly 12 used to force the blade 25 under the load so as to pick the same up and channel it into the interior of the body 10.

It is preferred that the blade portion 25 be provided with a hardened metallic insert 35 fixed as by fasteners 36 along the forward edge 37 of the blade 25, see particularly FIGURE 7, which insert 35 is provided with a tapered forward edge portion 38 substantially as is shown.

The handle assembly 12 consists of a pair of rearwardly convergent upper brace members 40 and 41 and a pair of upwardly and rearwardly convergent lower brace members 42 and 43, the terminal ends of which brace members sandwich therebetween a pivot plate 44, being rigidly attached thereto as by the fasteners 45 and 46 illustrated in FIGURE 1. The horizonal hand grip portion 47 of the handle assembly is connected to the pivot plate 44 by means of the shank 48 which is connected at one end rigidly to the cross piece 47 and which is provided with a sleeve 49 at its opposite end rigidly attached thereto as by fasteners 50 and which sleeve is bifurcated as indicated at 52, see particularly FIGURES 1 and 5 which bifurcations straddle the pivot plate 44 and carry a pivot pin 53 which projects centrally through the pivot plate and rotatably connects the shank 48 thereto.

As is shown most clearly in FIGURE 4, the sleeve 49 is provided with an enlargement 60 on its lower side having a notch or slot 61 therein, receiving the latch element 62 therebetween, and pivotally attached thereto as by the pivot pin 63. A spring 64 normally urges the latch to an engaged position with the pivot plate 44, the latch being provided with a hook 65 at its forward free end engageable with one of several notches 66 in the pivot plate substantially as is shown.

The latch 62 is provided with an ear portion 67 apertured as at 68 to receive the hooked end portion 69 of an actuating rod 70 therein. The actuating rod 70 is, in turn, connected at its opposite end to a pivoted lever element 72 having leg portions 73 and 74 straddling the shank 48 and pivotally connected thereto as by pins 75 whereby the operator may grasp the lever 72 and pull the same rearwardly to effect disengagement of the latch 62 from the pivot plate 44 and hence permit of adjustment of the cross piece 47 relative to the ground surface for accommodating for the height of the operator.

The sleeve 49, as can be seen in FIGURE 1, and as is also illustrated in FIGURE 5, is provided with a pair of spaced openings 80 and 81 on each side thereof adapted to receive, respectively, the laterally inwardly directed ear portions 82 and 83 rigid with the legs 84 and 85 of a stand assembly indicated generally by the reference character 86. The legs 84 and 85 are connected together through the bight portion 87 which is adapted to engage the ground surface and as is clearly illustrated in FIGURE 5 and thus permitting of relative outward movement of the legs 84 and 85 with respect to each other so as to engage and disengage the ears 82 and 83 within the openings 80 and 81 respectively so as to removably affix the stand to the handle assemblage and permit of the use of the stand in the manner which is illustrated best in FIGURE 2.

As can be best seen in FIGURE 3, the previously mentioned bearings 31 are adapted to receive the opposite end portions 90 and 91 of a wheel and axle assembly indicated generally by the reference character 92. Essentially, the assembly 92 consists of a pair of shafts 93 and 94, the latter of which is provided with a counterbore 95 telescopically receiving the inner end portion 96 of the former shaft 93 and permitting of a collapsing movement of the axle shafts 93 and 94 with respect to each other to permit their initial insertion within the bearings 31. The two shafts 93 and 94 carry wheels 97 and 98 adjacent the outer end portions 90 and 91 respectively thereof and which are located immediately inboard of the bearings 31. As can be best illustrated in FIGURE 2, the diameter of the wheels 97 and 98 is such as to permit the positioning of the cart in the manner illustrated, that is, with the forward end portions 30 of the side rails being in flat engagement with the supporting ground surface and with the blade 25 therefor in scooping position. The wheels may or may not be used, as is desired.

In order to protect the insert 35 for the blade 25, a guard assembly indicated generally by the reference character 100 and illustrated best in FIGURES 6 and 7 may be utilized. The guard includes a bight portion 101 and a pair of rearwardly extending legs 102 and 103 at the opposite ends thereof apertured to receive fasteners 104 and 105 extending through registering apertures in the forward extensions 21 and 22 of the body. The bight portion 101 of the guard effectively protects the insert 35 from damage or from injury to a person when the device is not in use.

The form of the invention illustrated in FIGURE 8 is a slightly modified construction and is identical in all respects to the assembly indicated generally by the reference character 110. In this particular case, the handle assembly comprises a pair of substantially horizontal and parallel rearwardly extending upper brace members 111 and 112 as well as a pair of parallel, upwardly angulated lower brace elements 113 and 114 converging with and intersecting with the rearward terminal end portions of the upper braces 111 and 112 in the manner illustrated and rigidly interconnected thereat and carrying, therebetween, a rigid cross piece or hand grip element 115 substantially as is shown. This form of the invention is, of course, of more economical construction than the embodiment illustrated in FIGURES 1–7 inclusive.

The foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention as claimed.

What is claimed as new is as follows:

1. A scoop-type cart comprising a body in the form of a receptacle having an open front and provided thereat with a scoop blade, a handle assembly attached to the rear of said body for manipulating the cart, and a supporting frame beneath said body and rigidly attached thereto, said frame including side rails extending along opposite sides of said body and having ground engaging forward portions substantially coplanar with said scoop blade so that said cart may be tilted forwardly to engage said forward portions of the side rails with the ground so as to position said scoop blade for gathering material, said handle assembly including rearwardly extending braces carrying a vertical pivot plate, a hand grip member including a shank pivotally attached to said plate and means selectively latching said shank in a plurality of pivoted positions with respect thereto, a stand fixed to said handle and extending downwardly therefrom, a base on the lower end of the stand in approximate alignment with the ground engaging portions of the frame, said base being selectively movable to a plurality of positions by said handle and being selectively secured in any one of said positions by said last mentioned means whereby said scoop blade may be maintained in contact with the ground surface regardless of irregularities in said surface.

2. The assembly as defined in and by claim 1 wherein said stand is detachably affixed to said handle assembly, said stand having a pair of vertical legs connected to said base sandwiching said pivot plate and the adjacent portion of said shank therebetween, a pair of laterally inwardly directed pins carried by each leg, and said plate and shank being provided with recesses receiving said pins.

3. The combination of claim 1 wherein said means includes a latch mounted for movement about a pivot pin, resilient means urging said latch into engagement with one of said recesses, and an actuating rod pivoted to said latch spaced from said pivot pin.

References Cited in the file of this patent

UNITED STATES PATENTS

| | | |
|---|---|---|
| 284,647 | Matcham | Sept. 11, 1883 |
| 1,280,670 | Cornell | Oct. 8, 1918 |
| 1,468,161 | Laystrom | Sept. 18, 1923 |
| 2,570,674 | Haywood | Oct. 9, 1951 |
| 2,631,862 | Johnson | Mar. 17, 1953 |
| 2,852,872 | Benz | Sept. 23, 1958 |
| 2,852,873 | Benz | Sept. 23, 1958 |
| 2,867,449 | Shawver | Jan. 6, 1959 |